Nov. 13, 1962 P. E. AXON ETAL 3,064,076
RECORDING OF TELEVISION PROGRAMMES
Filed Sept. 12, 1958
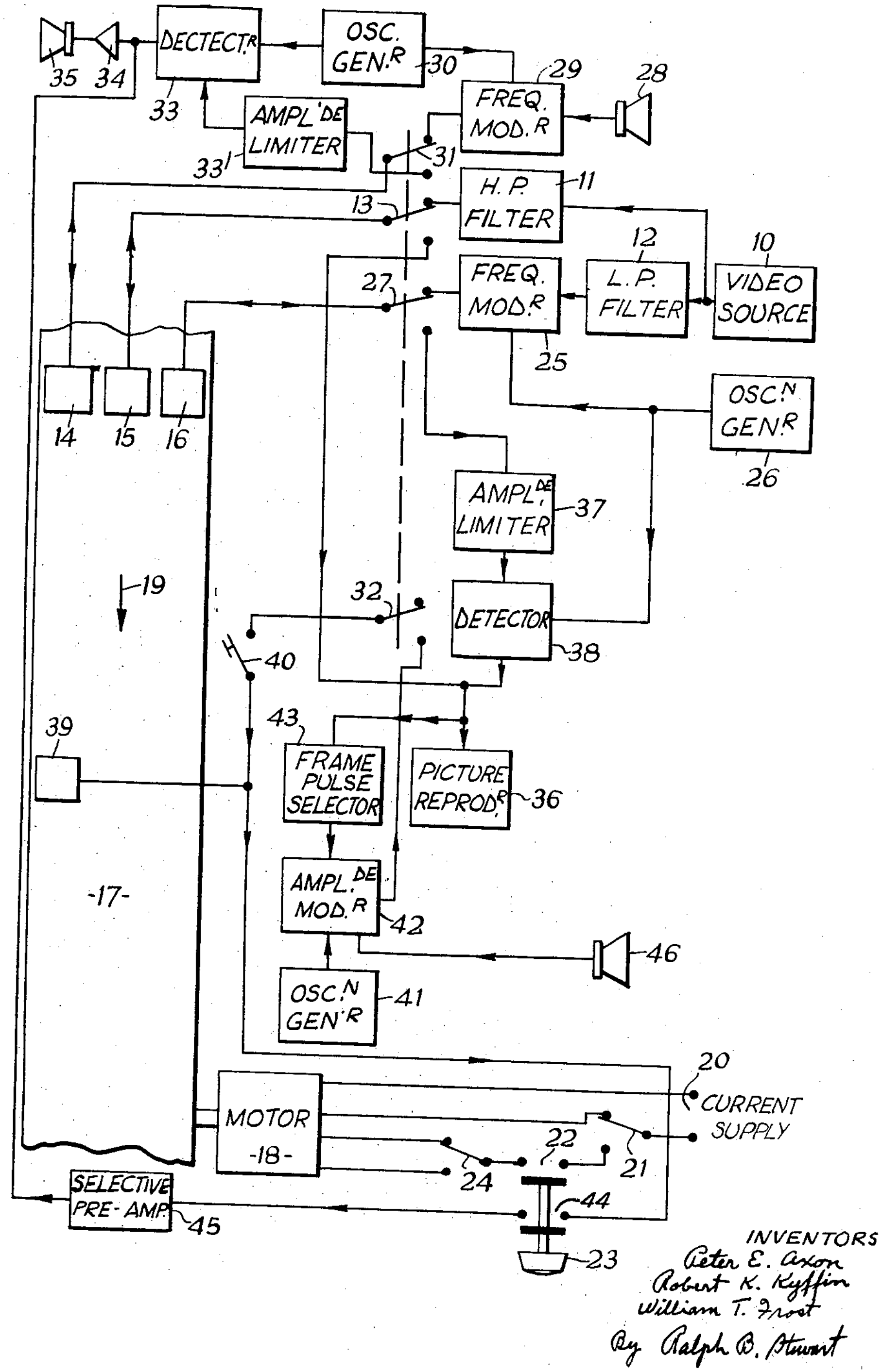
INVENTORS
Peter E. Axon
Robert K. Kyffin
William T. Frost
By Ralph B. Stewart
ATTORNEY United States Patent Office 3,064,076
Patented Nov. 13, 1962

3,064,076

RECORDING OF TELEVISION PROGRAMMES

Peter Eric Axon and Robert Kenneth Kyffin, London, England, and William T. Frost, Menlo Park, Calif., assignors to Marconi's Wireless Telegraph Company Limited, Essex, England, and Standard Telephones & Cables Limited, London, England Filed Sept. 12, 1958, Ser. No. 760,580
Claims priority, application Great Britain Sept. 17, 1957
9 Claims. (Cl. 178—5.8)

The present invention relates to the recording of television programmes in the form of variations in magnetisation of a magnetic medium which is usually in the form of a coating on a carrier, such for example as a tape. For convenience the coated carrier will be referred to herein as a tape, although magnetic media in other forms may be used.

It is usually a requirement of such recording apparatus that it should be possible to edit a previously recorded programme by cutting out unwanted portions and rejoining the tape. The recording machine may be provided with means for spooling the tape backwards and forwards in order to permit a desired point in the recording to be reached.

However, unlike recordings in the form of motion picture films, the recording on the tape is a waveform which is invisible. Even if the presence of modulation be made apparent, for example by means of an iron powder, the pattern so produced does not convey the required intelligence to an observer to enable him to identify a particular feature in the recording. In other words, the tape must be run at the correct speed past the reproducing head before a picture can be reproduced and identified.

A special difficulty arises in television recordings owing to the high speed at which the tape has to be run in order to permit good resolution of the high frequencies involved. Such high tape speeds are not convenient for editing.

The present invention has for its object to provide simple means whereby desired points on a magnetic television recording can be "marked" and identified for editing purposes or for starting in subsequent reproduction. The term "editing" is here assumed to include the cutting and joining or the selective erasure of previously recorded tape.

According to the present invention, there is provided apparatus for recording television and accompanying sound signals upon a magnetic recording medium and for reproducing the signals from such medium, the apparatus comprising means for varying the speed of the recording medium between a high value suitable for recording the television and sound signals and a much lower value suitable for editing, means under the control of an operator for applying to the sound-recording head, or to a separate head, while the medium is moving at the higher speed, a cueing oscillation having a frequency which is outside the frequency band of the recorded sound signals and which yields an oscillation of audible frequency when the medium is moving at the lower speed, and means for reproducing the said audible frequency oscillation when the medium is moved at the lower speed.

The invention will be described, by way of example, with reference to the accompanying drawing, as applied to a form of recording and reproducing apparatus in which the television signals are divided into two frequency bands, the lower band is frequency-modulated on to a carrier and recorded along one track, and the higher frequency band is recorded directly on a separate track. The sound signals are frequency-modulated on another carrier and recorded on a third track. The invention can, of course, equally well be applied to other forms of recording apparatus. The speed of the tape may, for instance, be about 200 inches per second and the sound may be frequency-modulated using a carrier of 250 kc./s. mean frequency. It will be assumed that, for editing, a lower tape speed of, say, 20 inches per second is employed.

Referring to the drawing, which is a block circuit diagram of the apparatus, television signals from a source 10, which may include a television camera and suitable amplifier, are applied to a high-pass filter 11 and to a low-pass filter 12. The high-pass filter 11 is arranged to pass the higher video frequencies, for instance above 100 kc./s. and suppress the lower frequencies. The higher frequencies are passed through a switch 13 to one of three recording and reproducing heads 14, 15 and 16, namely to the head 15. The heads are adapted to record upon and reproduce from a magnetic tape 17 driven by a motor 18 in the direction of the arrow 19. The motor 18 is fed from a current source connected to terminals 20 through a speed control switch 21, contacts 22 of a push-button switch 23, and a reversing switch 24. With the switch 21 in the setting shown, the tape is driven at the higher speed (200 inches per second) in the direction of the arrow 19. When the switch 21 is reversed and the push-button 23 is pressed the tape is driven at the lower speed (20 inches per second), and in a forward or backward direction depending upon the setting of the switch 24.

The television signals passing through the low-pass filter 12, that is those of frequencies from 0 to 100 kc./s., are applied to a frequency modulator 25 where they frequency-modulate an oscillation, for example of 750 kc./s., from a generator 26. A deviation of about 500 kc./s. is suitable, peak white and the base of synchronising pulses corresponding to 500 kc./s. and 1 mc./s. respectively. The output of the frequency modulator 25 is applied through a switch 27 to the head 16.

Although, for simplicity, simple filters 11 and 12 have been shown for splitting the band, preferably the splitting is achieved by using a subtraction technique such as is described in an article by Fredendall and Kennedy entitled "Linear Phase-Shift Video Filters" published in R. C. A. Review, September 1950. The complete signal is passed through a low-pass filter, which has a cut-off frequency of 150 kc./s. and constant group-delay up to 80 kc./s., to the control grid of one of two cathode-coupled valves. The control grid of the second valve is also fed with the complete television signal, and the time delays in both paths at frequencies below 80 kc./s. are equalised by means of delay cable. All the frequency components below 80 kc./s. cancel at the amplifier output when the relative levels of the signals on the grids are correct and this output is fed to the recording head 15 which records the higher frequencies. It should be noted that both bands contain signal information at frequencies from 80–150 kc./s., where the group delay of the filter is not constant. This method of separation obviates the need for accurately matched high-pass and low-pass filters.

The output of the low-pass filter is also fed to an amplifier which provides the correct signal level for the frequency modulator 25. The D.C. component of the signal is restored at the grid of the modulator valve, to reduce the bandwidth occupied by the frequency-modulated signal. The oscillator 26 may be a multivibrator as described in "Modulation Theory" by Harold S. Black (published by Macmillan & Co.), with the common return point of the two grid resistors D.C.-coupled to the output of the modulator. As the frequency of oscillation of the multivibrator is dependent upon the potential of this common return point, variations in signal level at the modulator output will produce changes in the oscillator frequency. The output of the oscillator is amplitude-limited before it is passed to the recording head 16 which records the frequency-modulated signal.

Sound signals from a microphone 28 are applied to a frequency-modulator 29 in which they frequency-modulate an oscillation from a generator 30. These frequency-modulated signals are fed through a switch 31 to the head 14.

The three heads 14, 15, 16 may be built up in known manner into a unitary structure with suitable magnetic screening between the three sections.

The three switches 31, 13 and 27, together with a further switch 32, are ganged and when they are in the settings shown, sound and two television bands are recorded along three tracks on the tape 17.

When the switches 31, 13 and 27 are reversed, the signal sources 10 and 28 are disconnected from the heads 14, 15, 16 and the apparatus is in condition for reproduction. Signals from the sound head 14 are applied through an amplitude limiter 33' to a detector 33 fed with oscillations from the generator 30 and the audio signals are amplified at 34 and applied to a loudspeaker 35.

The higher video signal from the head 15 is applied to a picture reproducer 36. The frequency-modulated television signals from the head 16 are applied through an amplitude limiter 37 to a detector 38 supplied with oscillations from the generator 26 and the lower frequency television signals are applied to the picture reproducer 36.

On the sound track and at some distance from the sound recording head 14 in the direction of the arrow 19, is provided a cueing head 39 to which oscillations can be fed whenever a key 40 is pressed when the switch 32 is in the opposite position to that shown, that is when the ganged switches are set for reproducing. The oscillation applied to the cueing head is arranged to have a frequency outside the frequency band of the signals recorded by the head 14; for instance it may be of 30 kc./s. In the example illustrated the oscillation fed to the head 39 is amplitude-modulated or chopped by the frame synchronising signals for a reason that will be given later.

Thus oscillations of say 30 kc./s. from a generator 41 are fed to an amplitude modulator 42 to which are applied frame pulses from a frame pulse selector 43 to which the reproduced television signals are applied.

When the tape 17 is running at the higher speed and is being reproduced for editing purposes, the operator presses the key 40 whenever he wishes to "mark" the tape. The modulated 30 kc./s. oscillation is then recorded on a small length of the sound track. Since the frequency of this oscillation is considerably below the frequency band of the recorded frequency-modulated sound signals, it will not be noticeable when the recorded sound is being reproduced at the higher speed. Moreover any interfering effects that this cueing signal might have on the reproduced sound are eliminated by the amplitude-limiting process in the limiter 33'.

When, by reversing the switch 21, the tape is moved at the lower speed used for editing past the heads, an audio oscillation is generated in the cueing head 39 and this is fed through contacts 44 of the press-button switch 32 (when pressed) and through a selective pre-amplifier 45 to the input of the amplifier 34. Thus if, as described, a 30 kc./s. oscillation has been recorded for cueing purposes at 200 ins./sec. it will appear as a 3 kc./s. note from the loudspeaker 35 when passing the cueing head 39 at an editing speed of 20 ins./sec.

The pre-amplifier 45 is responsive to audio frequencies but unresponsive to the frequency band of the frequency-modulated sound.

By manipulating the press button 23 and the reversing switch 24 the tape can be moved backward or forward at the lower speed as required.

In use, suitable allowance can be made for the "reaction time" required by the operator to press the cueing key during the observation of the reproduced picture, and a close approximation can then be made to the point at which editing, or starting (as required), was considered desirable. For instance, if the operator has a reaction time of ⅕ second, the tape should be cut, or started, at a point preceding the "mark" by about 40 inches when the tape speed is 200 ins./sec.

The amplitude modulation of the cueing signal by the frame pulses may be carried out either so that the cueing signal consists of a series of long bursts of the cueing frequency separated by gaps when the frame pulses occur or so that the cueing signal consists of short bursts of the cueing frequency only during the frame pulses. Since the sound and vision tracks are on the same tape and are, therefore, exactly synchronised, the cueing signals recorded on the one track will indicate the position along the tape at which frame signals occur on the video tracks. In subsequent cutting and splicing operations, which involve the examination of the cue signal by audio or other means, it will then be possible to effect joins at suitable positions within the frame suppression period, thus avoiding undesirable interruptions of the frame synchronisation train in subsequent reproduction of the recorded television pictures.

Use may be made in examining the cue signal of a "flux-sensitive" head such for example as that described in the specification of British Patent No. 782,572. Such a head will give an indication of a recorded signal without requiring relative movement between the head and the tape. The editor is then able to find the position of frame signals along the tape by means of the cueing track when passing or pulling the tape slowly through the system in the manner required for cutting and splicing operations.

When the flux-sensitive head is used to detect the presence of the modulated 30 kc./s. cue signal there is, of course, no reason why it will not also detect the presence of the recorded frequency-modulated sound signal upon which the cue signal may or may not, by chance, have been superimposed. This may be confusing. It is, however, quite possible to avoid confusion by utilisation of the attenuation in the reproduced signal which arises in any head when it is separated from the recorded tape. Thus when a head is separated from a tape by a distance equal to the wavelength recorded a drop in signal level of some 55 db will occur (see for example "The Reproduction of Magnetically Recorded Signals" by R. L. Wallace, Bell System Technical Journal, 1951, 30, p. 1146). In the system described, the wavelength of the cue signal will be some eight times that of the recorded sound signals (which use a 250 kc./s. frequency-modulated carrier). It is, therefore, easily possible to introduce a calculable separation between the flux-sensitive cueing reproducing head and the tape such that there is large attenuation of the frequency-modulated sound signals but only a small, and quite acceptable, attenuation of the cue signal. This will make the flux-sensitive head insensitive to any sound signal which may be coincident with cueing signals and the aforementioned confusion is eliminated. The separation may be introduced by fixing some non-magnetic spacer of the calculated thickness to the front of the flux-sensitive head or it may be achieved by suitable positioning of head and adjacent tape guides so that the tape is separated from the head by the desired distance.

The system herein described uses a separate cueing head both for the recording and reproduction of cueing signals in the manner specified. Separate recording and reproducing heads may, however, be used for cueing, or the head 14 recording the frequency-modulated audio signal may also be used in either or both of these roles, appropriate switching and associated electrical circuitry being provided in each case.

If desired, the cueing signal may be modulated with spoken editing instructions. For this purpose suitable audio signals may be fed to the modulator 42 from a microphone 46.

Many details of the arrangement not essential to the understanding of the invention have been omitted for the sake of clearness. It will be evident to those skilled in the art what additional elements can usefully be incorporated.

We claim:

1. Apparatus for recording television and accompanying sound signals upon a magnetic recording medium and for reproducing the signals from such medium, comprising television recording and reproducing head means and sound recording and reproducing head means mounted in recording and reproducing relation to said medium, said television and sound head means co-operating with different tracks on said medium, means for driving said medium past said head means, means for varying the speed of said driving means and hence of said medium relative to said head means between a high and low value, a source of television signals, a source of sound signals, a source of cueing oscillations, television reproducing means, sound reproducing means, cueing switch means, means operative when said medium is moving at said high speed value to couple said television and sound head means respectively to said television and sound signal sources, means also operative when said medium is moving at said high speed value to couple said television head means to said television reproducing means and simultaneously to couple said cueing oscillation source through said cueing switch means to said sound head means, and means operative when said medium is moving at said low speed value for coupling said sound head means to said sound reproducing means for converting the recorded cueing oscillations into sound.

2. Apparatus according to claim 1, wherein said sound head means comprise a sound recording and reproducing head and a cueing recording and reproducing head, said cueing head being spaced from said sound head in the direction of movement of said medium, said sound recording and reproducing head being coupled to said sound signal source and said cueing head being coupled to said cueing oscillation source through said cueing switch when said medium is moving at said high speed value.

3. Apparatus according to claim 1, wherein said cueing oscillations are of a frequency outside the frequency band of said sound signals.

4. Apparatus according to claim 3, wherein the signals from the sound source comprise a carrier frequency-modulated with audio frequency signals.

5. Apparatus according to claim 4, further comprising a flux-sensitive head responsive to magnetisation independently of movement of the recorded medium and means for maintaining said flux-sensitive head spaced from said medium, said spacing increasing the response of said flux-sensitive head to said recorded cueing oscillations relatively to the response to said recorded sound signals.

6. Apparatus for recording television signals upon a magnetic recording medium and for reproducing the signals from such medium, comprising transducer means for recording and reproducing signals, driving means for moving said medium relatively to said transducer means, means for varying the speed of said driving means and hence of said medium relative to said transducer means between a high and low value, means operative when said medium is moving at said high speed value to couple said television signals to said transducer means, whereby said television signals are recorded on said medium, a source of cueing oscillations, means operative when said medium is moving at said high speed value for coupling said source of cueing oscillations to said transducer means, whereby said cueing oscillations are recorded on said medium, a sound reproducing device and means operative when said medium is moving at said low speed value to couple the cueing oscillation signals in the output of said transducer means to said sound reproducing device whereby cueing oscillations of reduced frequency from said medium are reproduced by said sound reproducing device.

7. Apparatus for recording television and accompanying sound signals upon a magnetic recording medium and for reproducing the signals from such medium, comprising transducer means for recording and reproducing signals, driving means for moving said medium relatively to said transducer means, means for varying the speed of said driving means and hence of said medium relatively to said transducer means between a high and a low value, means operative when said medium is moving at said high speed value to couple said television and said sound signals to said transducer means, whereby said television and sound signals are recorded on said medium, a source of cueing oscillations, means generating a signal at the frame frequency of said television signal, modulating means coupled to said generating means and to said source of cueing oscillations for modulating said cueing oscillations with said frame frequency signal, means operative when said medium is moving at said high speed value for coupling said modulating means to said transducer means, whereby said modulated cueing oscillations are recorded on said medium, a sound reproducing device, and means operative when said medium is moving at said low speed value to couple the cueing oscillation signals in the output of said transducer means to said sound reproducing device whereby modulated cueing oscillations of reduced frequency from said medium are reproduced by said sound reproducing device.

8. Apparatus according to claim 7 wherein the frequency of the generating means is controlled by the frame pulses from said television signal.

9. Apparatus for recording a television signal and an accompanying sound signal upon a magnetic recording medium and for reproducing the signals from such medium, comprising a source of cueing signals in a frequency band substantially lower than from that of said sound signal, first and second transducer means positioned to cooperate with separate tracks on said medium, means for moving said medium past said transducer means, means coupling said television and sound signals to said first and second transducer means respectively whereby the television and sound signals are recorded upon said separate tracks, switch means, means coupling said source of cueing signals through said switch means to said second transducer means, whereby upon operation of said switch means a cueing signal is recorded upon the same track as said sound signal, a flux-sensitive head responsive to magnetisation independently of movement of the said medium and positioned adjacent said same track, and means spacing said flux-sensitive head at a distance from said same track rendering said flux-sensitive head selectively responsive to said recorded cueing signal and relatively substantially less responsive to said sound signal.

References Cited in the file of this patent

UNITED STATES PATENTS 2,734,948 Mueller ---------------- Feb. 14, 1956

OTHER REFERENCES

Magnetic Video Tape Editing Apparatus, RCA Technical Notes, RCA TN 20, August 9, 1957.

Ampex's New Video Tape Recorder, Tele-Tech & Electronic Industries, August 1956, pages 72, 73, 108, 110.